(12) United States Patent
Lovas et al.

(10) Patent No.: US 9,729,099 B1
(45) Date of Patent: Aug. 8, 2017

(54) SENSORLESS CONTROL OF AC INDUCTION MOTOR METHOD AND APPARATUS

(71) Applicant: Freescale Semiconductor, Inc., Austin, TX (US)

(72) Inventors: Ivan Lovas, Prievidza (CZ); Pavel Sustek, Roznov pod Radhostem (CZ); Petr Staszko, Frydek-Mistek (CZ)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/159,292

(22) Filed: May 19, 2016

(51) Int. Cl.
*H02P 27/04* (2016.01)
*G01B 7/14* (2006.01)
*H02P 23/14* (2006.01)
*H02P 23/07* (2016.01)
*H02P 6/185* (2016.01)

(52) U.S. Cl.
CPC ............. *H02P 23/14* (2013.01); *H02P 23/07* (2016.02); *H02P 6/185* (2013.01)

(58) Field of Classification Search
CPC ........ H02P 6/18; H02P 6/182; H02P 23/0004; H02P 6/26; H02P 6/16; H02P 23/14; H02P 23/07; G11B 19/2054
USPC ........................................................ 318/801
See application file for complete search history.

(56) References Cited

U.S. PATENT DOCUMENTS

| | | | |
|---|---|---|---|
| 5,010,287 A | 4/1991 | Mukai et al. | |
| 6,014,006 A | 1/2000 | Stuntz et al. | |
| 6,636,011 B2 | 10/2003 | Sadasivam et al. | |
| 6,727,675 B2 | 4/2004 | Yoshimoto et al. | |
| 2001/0033147 A1* | 10/2001 | Smith | F04D 27/00 318/727 |
| 2011/0114049 A1 | 5/2011 | Garrard et al. | |
| 2011/0248659 A1 | 10/2011 | Balazovic et al. | |
| 2012/0146626 A1* | 6/2012 | Bieler | H02P 6/185 324/207.16 |
| 2015/0340980 A1 | 11/2015 | Lovas et al. | |
| 2016/0056741 A1 | 2/2016 | Lovas et al. | |

OTHER PUBLICATIONS

NXP Freescale Semiconductor, Inc., 3-Phase AC Induction Motor Control with PFC Using MC9S08MP16, Design Reference Manual, Devices Supported: MC9S08MP16, Document No. DRM115, Rev. 0, Nov. 2009.
NXP Freescale Semiconductor, Inc., 3-Phase BLDC Sensorless Control with MQX RTOS Using the K60N512, Document No. DRM135, Rev. 0, Jun. 2012.
Freescale Semiconductor, Inc., Sensorless ACIM Field-Oriented Control, Design reference Manual, Document No. DRM150, Rev. 0, Jan. 2016.
Freescale Semiconductor, Freescale System Solutions, Motor Control Technologies, 2007.

* cited by examiner

*Primary Examiner* — Bentsu Ro
*Assistant Examiner* — Zemenay Truneh

(57) ABSTRACT

A method and apparatus are provided for controlling a sensorless alternating current induction motor (ACIM) having a rotor and a stator comprising a plurality of stator windings by applying a plurality of phase shifted voltages to the plurality of stator windings in the ACIM such that two energized stator windings are connected to first and second phase shifted voltages to cause rotation of the rotor relative to the stator while a third unconnected stator winding is floating so that a DC bus current and an inducted voltage can be measured from the ACIM and used to compute an estimated rotor speed.

19 Claims, 8 Drawing Sheets

SENSORLESS CONTROL OF AC INDUCTION MOTOR METHOD AND APPARATUS

BACKGROUND OF THE INVENTION

Field of the Invention

The invention relates generally to the field of electric motors. In one aspect, the present invention relates to the control and operation of sensorless alternating current induction motors.

Description of the Related Art

The alternating current induction motor (ACIM) is the most popular electric motor used in consumer and industrial applications, notable for the low cost, simple, and robust design since no mechanical commutator or permanents magnets are required. In operation, the motor efficiency and speed are controlled by adjusting the stator voltage according to a motor load by detecting the stator field speed. In the absence of mechanical or electrical contact between the ACIM stator and rotor, there are challenges with determining the relative positions and rotor speeds of the component parts. One position-indicating arrangement is to use sensors to detect a motor component position status as part of the motor control function, but such sensors add cost and increase complexity (due the additional sensors, wiring, connectors, soldering, etc.), reduce reliability (due in part to the sensor connectors that are prone to contamination from dirt and humidity), and are not suitable for applications (e.g., where the rotor is in closed housing and the number of electrical entries must be kept to a minimum, such as in a compressor, or in applications where the motor is immersed in a liquid such as some pumps). To address such shortcomings, sensorless motor control techniques may be used to detect a motor component position status. However, sensorless motor control techniques have a number of drawbacks, including operational complexity, expensive microcontroller requirements, and increased bill-of-materials costs. As a result, the existing solutions for operating alternating current induction motors are extremely difficult at a practical level.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

A sensorless alternating current induction motor (ACIM) control method and apparatus are described for reliably and efficiently controlling variable load electric motors with reduced software complexity and hardware costs to address various problems in the art where limitations and disadvantages of conventional solutions and technologies will become apparent to one of skill in the art after reviewing the remainder of the present application with reference to the drawings and detailed description provided herein. In selected embodiments, a software-based method and apparatus are provided for controlling an ACIM with a six-step sensorless control approach which energizes only two motor phases at all times to generate the stator field while leaving the third phase unconnected for use in measuring the inducted voltage which may be used to precisely estimate the rotor speed used to control the current supplied to the stator coils. In selected embodiments, the precision of the rotor speed estimation may be increased by properly measuring the actual DC-bus current. In a three-phase ACIM having three stator windings, each stator winding may be connected to receive a multi-phase voltage signal which defines two motor phase events (when the multi-phase voltage signal is connected to provide a positive or negative voltage) and two commutation events (when the multi-phase voltage signal is not connected, and the floating voltage integral reaches a threshold which triggers the commutation event). By shifting the multi-phase voltage signals that are applied to the three stator windings to be mutually shifted by 120 degrees from one another, six commutations are generated for each stator magnetic field electrical revolution. By using a 3-phase power stage, two motor phases may be energized concurrently to supply stator coil current that generates the stator fields, while simultaneously leaving the third phase unpowered to enable rotor speed estimation through integration of the voltage inducted during the unconnected phase, thus enabling use of a simple sensorless rate estimation algorithm that is suitable for variable or constant motor loads with high startup torques and that can be implemented inexpensively in terms of complexity and hardware costs.

Figure 1:
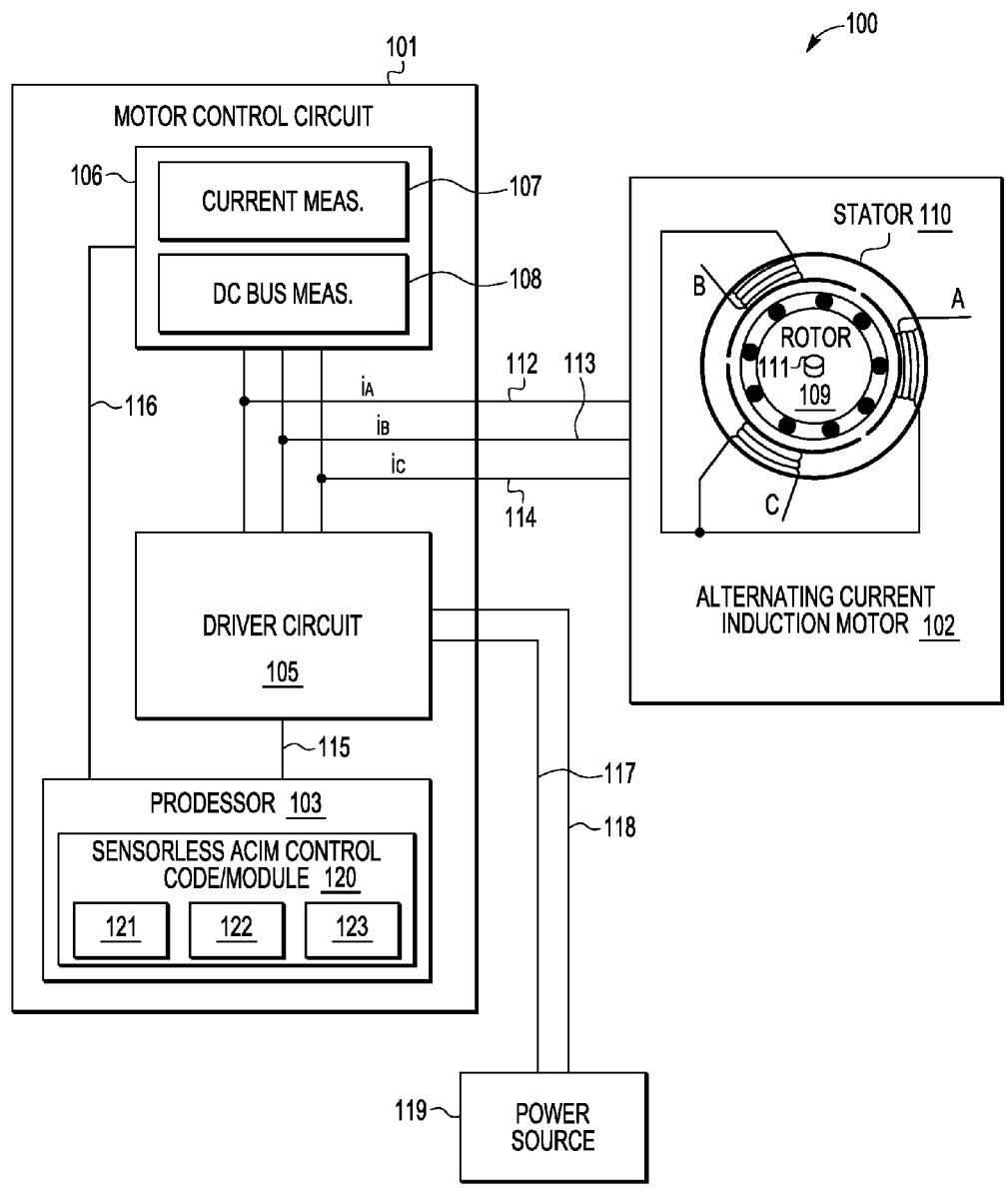
FIG. 1 is a block diagram illustration of an electric motor system comprising a sensorless ACIM controller in accordance with selected embodiments of the present disclosure.

Referring now to FIG. 1, there is shown a block diagram illustration of an electric motor system 100 which uses a sensorless ACIM controller 101 in accordance with selected embodiments of the present disclosure. The electric motor system 100 includes a sensorless ACIM controller 101, an alternating current induction motor 102, and power source 119. The ACIM controller 101 includes a processor 103, driver circuit 105, and measurement circuits 106. Processor 103 includes the sensorless ACIM control 120 which may be implemented in software, firmware or control code logic accessing from memory which stores programming instructions to be executed to configure the processor 103 into a machine that controls the ACIM 102 as disclosed herein. In whatever form implemented, the sensorless ACIM controller 120 may include a first control module 121 for controlling the measurement of the phase voltage, DC bus voltage, and DC bus current. In addition, the sensorless ACIM controller 120 may include a second control module 122 for controlling the sampling of a positive voltage induced in an unconnected phase. In addition, the sensorless ACIM controller 120 may include a third control module 123 for determining a commutation event, such as with an inducted voltage zero-crossing technique and the inducted voltage integration technique.

Measurement circuits 106 may include a current measurement circuit 107 and a direct current (DC) bus measurement circuit 108 for measuring the DC bus voltage and/or DC bus current. Motor 102 includes a rotor 109, stator 110, and shaft 111 that is mechanically coupled to rotor 109. Windings in the stator 110 are supplied with electric current to induce electric voltage in the rotor 109 to produce rotor torque via electromagnetic induction from the magnetic field of the stator windings. The induction motor 102 therefore does not require mechanical commutation, separate-excitation or self-excitation for all or part of the energy transferred from stator to rotor, as in universal, DC and large synchronous motors. In selected embodiments, the rotor 109 of the induction motor 102 can be wound type or squirrel-cage type. For example, three-phase squirrel-cage induction motors are widely used in industrial drives because they are rugged, reliable and economical. Although traditionally used in fixed-speed service, induction motors are increasingly being used with variable-frequency drives (VFDs) in variable-speed service. VFDs offer especially important energy savings opportunities for existing and prospective induction motors in variable-torque centrifugal fan, pump and compressor load applications. Squirrel cage induction motors are very widely used in both fixed-speed and variable-frequency drive (VFD) applications. Variable voltage and variable frequency drives are also used in variable-speed service.

In operation, the AC power supplied to the induction motor's stator 110 creates a magnetic field that rotates in time with the AC oscillations, causing the induction motor's rotor 109 to rotate at a slower or "slipped" speed than the stator field. The magnetic field of the induction motor stator 110 is therefore changing or rotating relative to the rotor, thereby inducing an opposing current in the induction motor's rotor 109, in effect the motor's secondary winding, when the latter is short-circuited or closed through an external impedance. The rotating magnetic flux induces voltages in the windings of the rotor 109 in a manner similar to voltages induced in a transformer's secondary winding(s). The currents in the rotor windings in turn create magnetic fields in the rotor that react against the stator field. Due to Lenz's Law, the direction of the magnetic field created will be such as to oppose the change in current through the rotor windings. The cause of induced current in the rotor windings is the rotating stator magnetic field, so to oppose the change in rotor-winding currents the rotor will start to rotate in the direction of the rotating stator magnetic field. The rotor accelerates until the magnitude of induced rotor current and torque balances the applied load. Since rotation at synchronous speed would result in no induced rotor current, an induction motor always operates slower than synchronous speed. The induction machine's essential character is that it is created solely by induction instead of being separately excited as in synchronous or DC machines or being self-magnetized as in permanent magnet motors.

Motor control circuit 101 is connected to induction motor 102 via one or more conductors 112, 113, and 114. Conductor(s) 112, 113, and 114 are connected to outputs of driver circuit 105 and to inputs of measurement circuits 106. Measurement circuits 106 are connected to processor 103 via one or more connection lines 116 to provide measurements from measurement circuits 106 to processor 103. Processor 103 is connected to driver circuit 105 via one or more connection lines 115 to allow processor 103 to control driver circuit 105. Power source 119 is connected to driver circuit 105 via AC or DC conductor lines 117, 118 to provide power for driver circuit 105 to apply to motor 102. Alternatively, the power source can be provided with more than 2 line outputs, for example 3-phase system with 3 (L1, L2, L3) or four lines (L1, L2, L3, N) or with a DC bus current ($I_{DC\ BUS}$) conductor.

Measurement circuits 106 can obtain measurements of current and/or voltage parameters for the induction motor 102. Current measurement circuit 107 can obtain one or more current measurements of motor 102, such as measured current drawn from the DC bus ($I_{DC}$ Bus) that is detected at the conductor lines 117, 118. In similar fashion, DC bus measurement circuit 108 can obtain one or more DC bus voltage and/or current measurements from induction motor 102. Each of current measurement circuit 107 and DC bus measurement circuit 108 can obtain a plurality of measurements, for example, with respect to the plurality of conductors 112, 113, and 114. Thus, for example, single phase and multiple phase (e.g., three-phase) motors can be controlled. Measurements can be, for example, complex measurements, which can include a direct component and a quadrature component sampled 90 degrees of phase away from the direct component. The measured current and/or voltage values captured by the measurement circuit 106 are connected over one or more connection lines 116 to processor 103.

Electric motor system 100 can be implemented to control operation of various types of induction motors 102, such as AC induction motors (ACIM), using different control instructions that are executed by processor 103, such as voltage-over-frequency (V/Hz) control with slip compensation. Different components can be used in driver circuit 105 to drive different motor types. For example, components compatible with voltages of different polarities can be used to implement driver circuit 105 for AC motors. Different components can be used in measurement circuits 106 to measure currents and voltages of different motor types. In the case of an alternating current (AC) motor, measurement circuits 106 can be capable of measuring both AC and DC voltage or current signals. In accordance with at least one embodiment, DC bus measurement circuit 108 may be implemented generally as a voltage measurement circuit not specifically limited to DC or AC voltage measurement.

Figure 2:
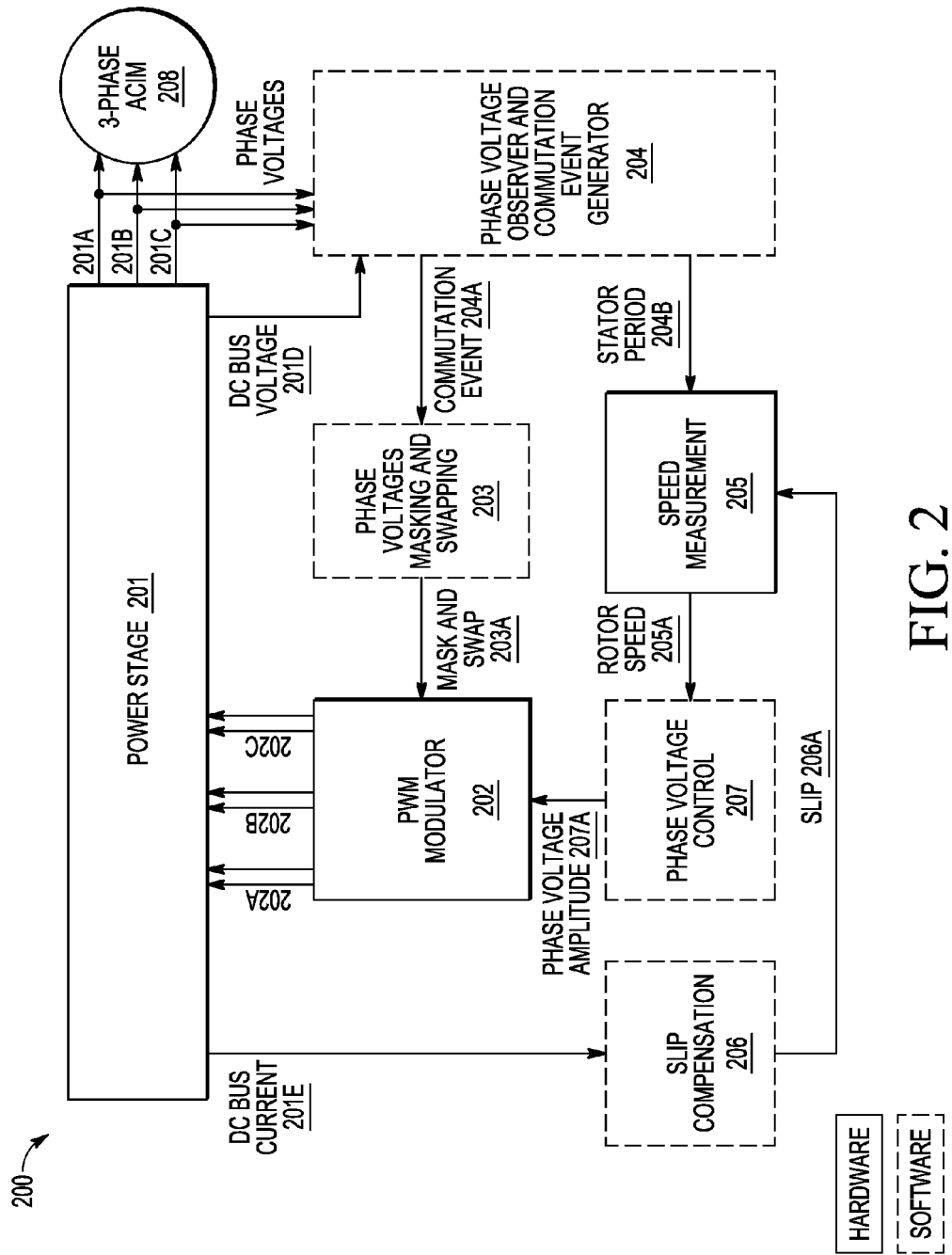
FIG. 2 is a block diagram of the hardware and software components of a sensorless ACIM system for implementing a multi-step sensorless alternating current induction motor control in accordance with selected embodiments of the present disclosure.

Referring now to FIG. 2, there is shown a block diagram of the hardware and software components of a sensorless ACIM system 200 for implementing a multi-step sensorless alternating current induction motor control in accordance with selected embodiments of the present disclosure wherein only two of the phase voltage signals 201A-C are powered at a time. The disclosed system 200 has an electric motor 208 which may be embodied as a 3-phase AC induction motor. The sensorless ACIM system 200 also includes a motor driver which may be embodied with an ACIM driver power stage hardware 201 having three outputs 201A-C coupled to terminals of the electronic motor 208. In selected embodiments, the ACIM driver power stage hardware 201 may be implemented with a pre-driver circuit (such as, for example, the GD3000 driver manufactured by NXP Semiconductors) and bridge inverter circuit which uses a plurality of power transistors to selectively couple a supply voltage (e.g., $U_{DC\_BUS}$) and ground voltage inputs to the three outputs 201A-C in response to PWM gate control signals 202A-C.

The PWM modulator hardware 202 generates the PWM gate control signals 202A-C so that the ACIM driver power stage hardware 201 energizes only two motor phases concurrently while leaving the third phase unpowered, thus generating six possible voltage vectors that may be applied to the induction motor 208. To control the timing and application of the PWM gate control signals 202A-C, the disclosed system 200 includes a phase voltage observer and commutation event generator 204 which is connected to receive and detect the phase voltage signals 201A-C and DC bus voltage signal 201D, such as by using analog-to-digital converter circuits. Based on integration of the observed phase voltages 201A-D, the phase voltage observer and commutation event generator 204 may use a control algorithm which generates the commutation event 204A by integrating the inducted voltage of the non-fed or unexcited phase. The integration starts when the non-fed phase's inducted voltage crosses zero, and when the integrated value reaches a predefined threshold value (which corresponds to a commutation point), the phase current is commutated. In response to the commutation event 204A, the PWM modulator hardware 202 is updated with mask and swap values 203A generated by the phase voltage masking and swapping process module 203.

The phase voltage observer and commutation event generator 204 may also include a stator period module for calculating the stator period values 204B for input to the speed measurement hardware 205 by measuring the time between successive commutation events. In selected embodiments, the stator period calculator is configured to filter the commutation period to get suitable input values to the speed measurement hardware 205 by calculating each stator period value 204B as the average from the last six commutation events, and then recalculating the averaged commutation period as the stator period 204B. Using the calculated stator period values 204B, the speed measurement hardware 205 may recalculate the stator period 204B (e.g., $T_{COM}$) as the rotor speed 205B (e.g., $1/T_{COM}$) for input to the phase voltage controller 207. To increase rotor speed estimation precision, the speed measurement hardware 205 is also connected to receive a slip compensation correction value 206A (e.g., s) generated by the slip compensation module 206 from the actual DC-bus current value 201E, thereby calculating the rotor speed 205A as the product of the slip and stator speed (e.g., $s*1/T_{COM}$). In selected embodiments, the slip compensation correction value 206A, which represents the estimate slip between the stator and rotor speed, may be calculated as a value s that is proportional to the actual DC-bus current value $I_{DC\text{-}BUS}$ (e.g., $s=k\times I_{DC\text{-}BUS}$), where "k" is a motor construction constant. By including the slip compensation correction 206A in the control loop, precision control is increased in the calculated rotor speed 205A that is output to the phase voltage control 207. At the phase voltage controller 207, a speed PI controller processes the estimate rotor speed 205A to generate the phase voltage amplitude signal 207A that is input to the PWM modulator 202 for generating the PWM gate control signals 202A-C.

Figure 3:
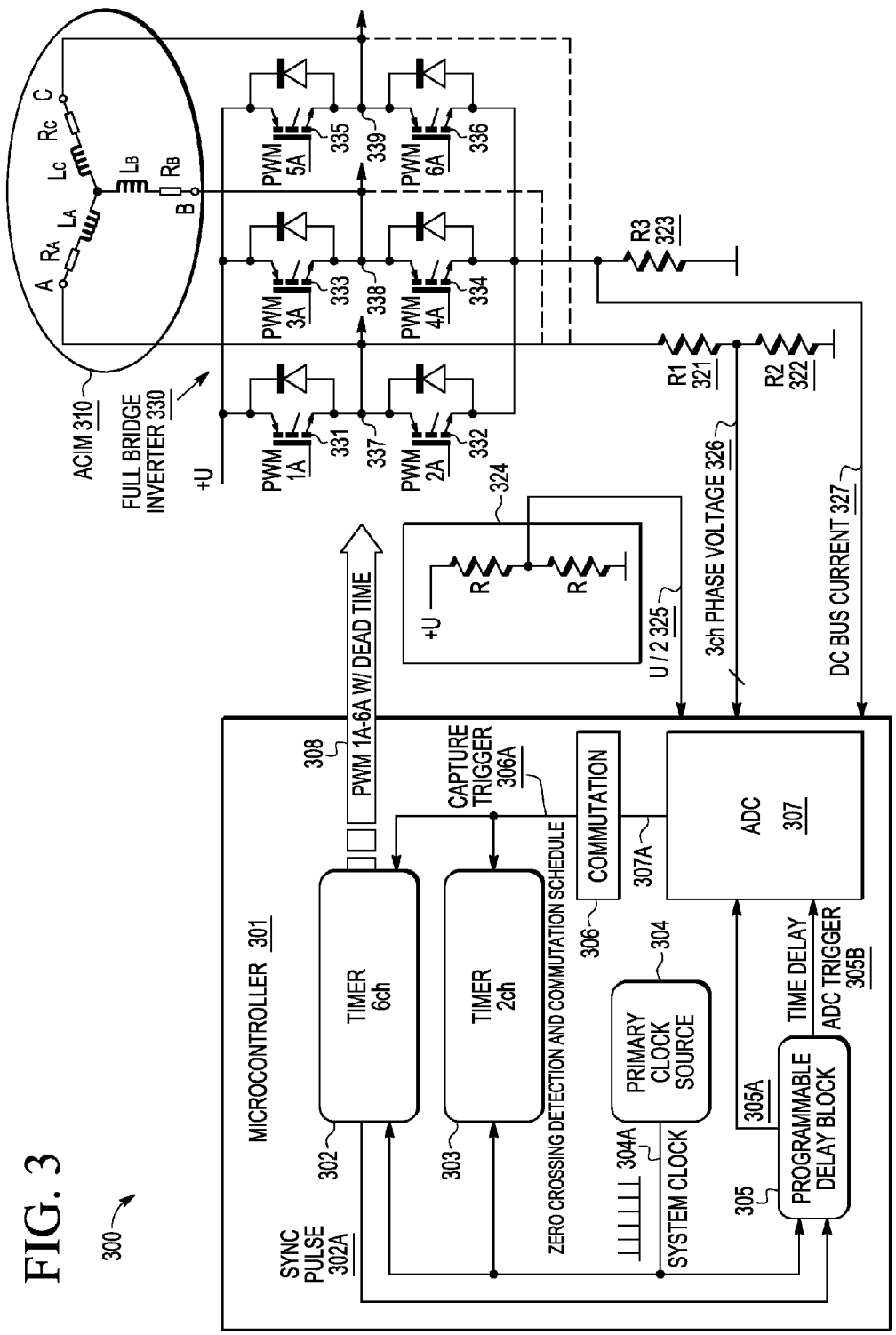
FIG. 3 is a simplified circuit schematic diagram of a sensorless ACIM controller structure that selectively switches a full bridge inverter to control a three-phase alternating current induction motor in accordance with selected embodiments of the present disclosure.

FIG. 3 is a simplified circuit schematic diagram of an electric motor system 300 in which a sensorless ACIM microcontroller 301 selectively switches a full bridge inverter 320 to control a three-phase alternating current induction motor 310 in accordance with selected embodiments of the present disclosure. In the disclosed electric motor system 300, the microcontroller 301 may be embodied as a pre-driver circuit which is connected to generate six PWM gate control signals 308, such as by using the GD3000 driver manufactured by NXP Semiconductors or any other suitable driver circuit. As illustrated, the PWM gate control signals 308 (e.g., PWM 1A-6A) from the microcontroller 301 are connected to the bridge inverter circuit 330 as gate control signals at the plurality of power transistors 331-336 which are connected with freewheeling diodes to selectively switch a supply voltage (e.g., $U_{DC\_BUS}$) and ground voltage input applied across R3 resistor 323, thereby generating the inverter output phase signals 337-339 which are connected to the ACIM 310, respectively, as phase voltage A 337, phase voltage B 338, and phase voltage C 339. With a "star" ACIM 310, the three motor phase signals 337-339 are terminated from the ACIM 310, while the common point is part of the motor wiring. In this arrangement, the output PWM signals 308 may be applied to gate three pairs of power transistors 331-336 (one pair for each motor phase) to generate 3-phase inverter output phase signals 337-339. As indicated, each of the inverter output phase signals 337-339 is also connected in a resistor divider feedback circuit 321-322 to the microcontroller 301 as inducted voltage signals on the 3-channel feedback line 326. The microcontroller 301 may also be connected to receive a feedback reference voltage signal 325, such as by applying the supply voltage (e.g., $U_{DC\_BUS}$) to a resistor divider circuit 324 to generate the reference voltage 325 as half the supply voltage (e.g., $V_{REF}=U_{DC\_Bus}/2$). The microcontroller 301 may also be connected to receive a feedback power supply current signal 327, such as the DC bus current drawn from the ground power supply (e.g., $I_{DC\_BUS}$).

At the microcontroller 301, the analog feedback signals 325-327 are digitally captured or measured by one or more analog-to-digital (ADC) blocks 307 under control of one or more ADC trigger signals 305 to generate digital commutation input signals 307A for the commutation unit 306 which determines the commutation events by detecting the zero-crossing by sensing the motor's non-fed phase voltage 326 and the DC-bus current 327 using the ADC 307. In response to the digital commutation input signals 307A, the commutation unit 306 generates capture trigger signals 306A which convey zero crossing detection and commutation schedule information and which are provided to the two-channel timer circuit 302 and six-channel timer circuit 303 which are set up to generate PWM signals 308 according calculated commutation event to thereby control the power switches 331-336 in the inverter 330 so that only two phases in the ACIM 310 are powered at time according to the estimated rotor speed, leaving the third stage for use in phase voltage integration and/or actual DC bus current measurement for use in estimating the rotor speed. With a three-phase alternating current induction motor 310, the commutation process switches each phase between a connected phase and an unconnected phase, requiring that the commutation block 306 generate six commutation events for each stator magnetic field electrical revolution so that a commutation is done every 60° (6×60°=360°). To this end, a primary clock source 304 provides a system clock signal 304A to the timer circuits 302, 303 and to a programmable delay block 305 which also receives a synchronization pulse 302A generated by the six-channel timer circuit 302 to help synchronize the ADC 307 with the generation of the PWM signals 308 by delaying the digital capture so that ADC measurement is always performed at time when none of MOSFETs changing its conductivity state, effectively filter noise caused by switching of power MOSFETs.

As disclosed herein, measurement by the ADC 307 is always performed at time when none of MOSFETs changing its conductivity state. To generate PWM signals 308 that switch "OFF" the bottom and top power switches of the non-fed phase, the microcontroller 301 may implement a complementary PWM mode wherein the top and bottom switches of a phase are operated complementarily. In the complementary PWM mode, a dead time must be inserted between the top and bottom switches to avoid any phase short circuit. The complementary switching can be implemented in both a bipolar or unipolar manner. The unipolar switching leads to lower switching losses and current ripple. However, from an inducted voltage point of view, the bipolar switching is a better choice since this allows having a duty cycle in the range of 50-100%. This significantly simplifies the induced voltage and current sensing.

Figure 4:
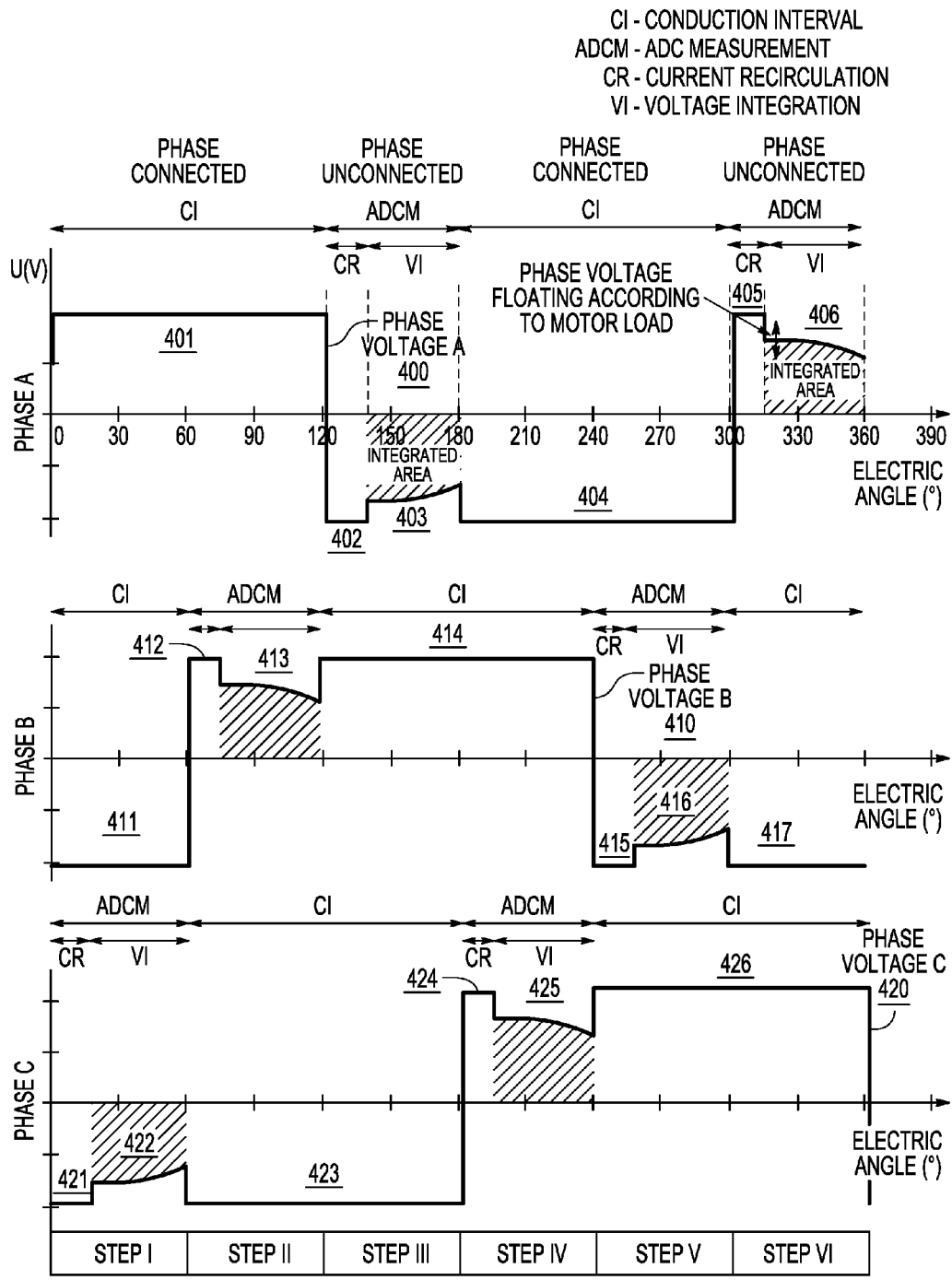
FIG. 4 is a timing diagram plot of shifted phase voltages applied to three stator windings during one electrical revolution of an electric motor rotor to illustrate a six-step sensorless ACIM control technique in accordance with selected embodiments of the present disclosure.

To provide additional details for an improved understanding of selected embodiments of the present disclosure, reference is now made to FIG. 4 which depicts timing diagram plots of shifted phase voltages 400, 410, 420 which are applied to three stator windings during one electrical revolution of an electric motor rotor to illustrate a six-step sensorless ACIM control technique in accordance with selected embodiments of the present disclosure. As illustrated, the first phase voltage 400 (e.g., Phase A), the second phase voltage 410 (e.g., Phase B), and the third phase voltage 420 (e.g., Phase C) are mutually shifted from one another by 120° for respective application to the three stator windings of the ACIM 310. Each phase voltage (e.g., Phase A 400) alternates between conduction intervals (CI) (e.g., 401, 404) and ADC measurement (ADCM) intervals (e.g., 402-403, 405-406). In the conduction intervals, the phase is powered by being connected to a positive voltage (e.g., 401) or a negative voltage (e.g., 404). However, during the ADCM intervals, the unconnected phase can be used to measure the phase voltage, though not during the current recirculation (CR) intervals (e.g., 402, 405) when there is still transient current flowing or recirculating through the freewheeling diode in the inverter (e.g., 330) just after the phase is disconnected from the DC bus (e.g., U). To trigger the ADC in time with the required instance of the PWM pulse, the programmable delay block 305 issues time-delayed trigger signals 305 to the ADC 307. With each of the shifted phase voltages (e.g., Phase A) including two commutation events (e.g., 403, 406) during which the sampled voltage values are processed to compute the commutation time, there are six commutation events generated between the three shifted phase voltages (e.g., Phase A, Phase B, Phase C) for each stator magnetic field electrical revolution so that a commutation is done every 60° (6×60°=360°).

The combined application of the shifted phase voltages 400, 410, 420 to the respective stator coils of the ACIM 310 result in the first stator coil (e.g., A) receiving a first Phase A voltage 400, while the second stator coil (e.g., B) receives a second Phase B voltage 410 and the third stator coil (e.g., C) receives a third Phase C voltage 420. The generated first Phase A voltage 400 includes a first conduction interval 401 (where the phase is connected to a positive voltage), a first ADCM interval having a first CR interval 402 (when the phase is first disconnected) and a first VI interval 403 (when the floating voltage is integrated), a second conduction interval 404 (where the phase is connected to a negative voltage), and a second ADCM interval having a second CR interval 405 (when the phase is first disconnected) and a second VI interval 406 (when the floating voltage is integrated to measure the motor load). Shifted 120° from the first Phase A voltage 400, the generated second Phase B voltage 410 includes a first conduction interval 414 (where the phase is connected to a positive voltage), a first ADCM interval having a first CR interval 415 (when the phase is first disconnected) and a first VI interval 416 (when the floating voltage is integrated), a second conduction interval 417, 411 (where the phase is connected to a negative voltage), and a second ADCM interval having a second CR interval 412 (when the phase is first disconnected) and a second VI interval 413 (when the floating voltage is integrated to measure the motor load). And shifted 120° from the first Phase A voltage 400 and the second Phase B voltage 410, the generated third Phase C voltage 420 includes a first conduction interval 426 (where the phase is connected to a positive voltage), a first ADCM interval having a first CR interval 421 (when the phase is first disconnected) and a first VI interval 422 (when the floating voltage is integrated), a second conduction interval 423 (where the phase is connected to a negative voltage), and a second ADCM interval having a second CR interval 424 (when the phase is first disconnected) and a second VI interval 425 (when the floating voltage is integrated to measure the motor load).

Figure 5:
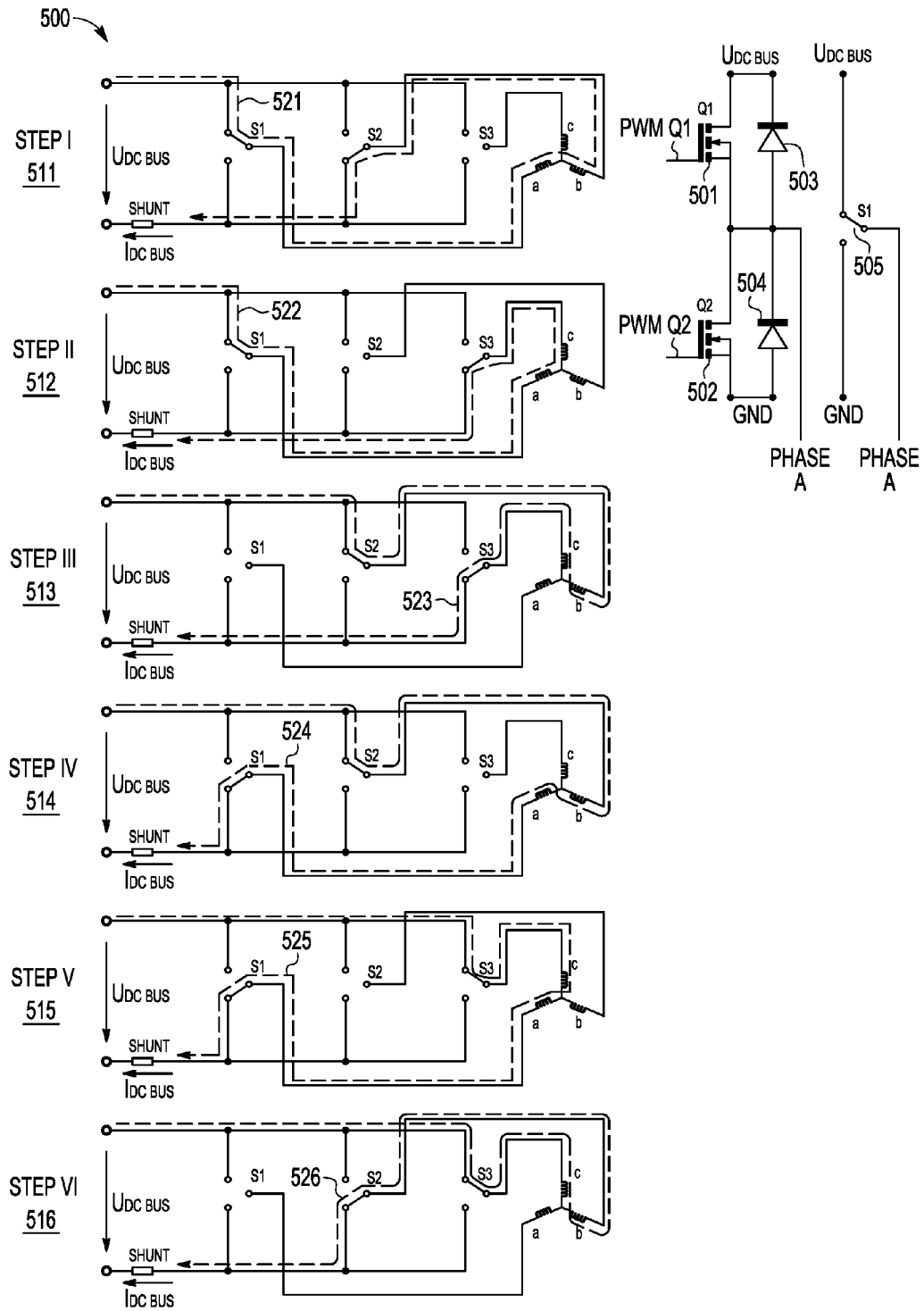
FIG. 5 illustrates the switching connections of the full bridge inverter in each of six steps used to implement sensorless ACIM control in accordance with selected embodiments of the present invention.

To provide additional details for an improved understanding of selected embodiments of the present disclosure, reference is now made to FIG. 5 which illustrates the switching connections of the full bridge inverter in each of six steps used to implement sensorless ACIM control. To simplify the representation of the switching circuits in the inverter circuit, the upper and lower power transistors (e.g., 501, 502) and parallel-coupled freewheeling diodes (e.g., 503, 504) connected to each phase voltage (e.g., Phase A) in the three-phase power stage inverter may be represented with a single switch (e.g., 505) by virtue of the PWM gate control signals (e.g., PWM Q1, PWM Q2) applied to the upper and lower power transistors (e.g., 501, 502). By properly generating the PWM gate control signals, the upper and lower power transistors in the inverter are connected in a first step 511 to route the current flow 521 through switches S1 and S2 (but not switch S3) so that only two stator windings (e.g., A and B) are energized while the other stator winding (e.g., C) is not powered. In the first step switching configuration 511, the first phase voltage (e.g., Phase A) applied to the first stator winding A is a positive voltage (e.g., $U_{DC\ BUS}$) while the second phase voltage (e.g., Phase B) applied to the second stator winding B is a negative voltage (e.g., $-U_{DC\ BUS}$), while the disconnected third stator winding may be used for voltage measurement. The first step switching configuration 511 corresponds to the indicated Step I in FIG. 4.

In the depicted second step 512, the upper and lower power transistors in the inverter are connected to route the current flow 522 through switches S1 and S3 (but not switch S2) so that only two stator windings (e.g., A and C) are energized while the third other winding (e.g., B) is not powered. In the second step switching configuration 512, the first phase voltage (e.g., Phase A) applied to the first stator winding A is a positive voltage (e.g., $U_{DC\ BUS}$) and the third phase voltage (e.g., Phase C) applied to the third stator winding C is a negative voltage (e.g., $-U_{DC\ BUS}$), while the disconnected third stator winding B may be used for voltage measurement. The second step switching configuration 512 corresponds to the indicated Step II in FIG. 4.

In the depicted third step 513, the upper and lower power transistors in the inverter are connected to route the current flow 523 through switches S2 and S3 (but not switch S1) so that only two stator windings (e.g., C and B) are energized while the other stator winding (e.g., A) is not powered. In the third step switching configuration 513, the second phase voltage (e.g., Phase B) applied to the second stator winding B is a positive voltage (e.g., $U_{DC\ BUS}$) and the third phase voltage (e.g., Phase C) applied to the third stator winding C is a negative voltage (e.g., $-U_{DC\ Bus}$), while the disconnected third stator winding A may be used for voltage measurement. The third step switching configuration 513 corresponds to the indicated Step III in FIG. 4.

In the depicted fourth step 514, the upper and lower power transistors in the inverter are connected to route the current flow 524 through switches S2 and S1 (but not switch S3) so that only two stator windings (e.g., B and A) are energized while the other stator winding (e.g., C) is not powered. In the fourth step switching configuration 514, the second phase voltage (e.g., Phase B) applied to the second stator winding B is a positive voltage (e.g., $U_{DC\ BUS}$) and the first phase voltage (e.g., Phase A) applied to the first stator winding A is a negative voltage (e.g., $-U_{DC\ BUS}$), while the disconnected third stator winding C may be used for voltage measurement. The fourth step switching configuration 514 corresponds to the indicated Step IV in FIG. 4.

In the depicted fifth step 515, the upper and lower power transistors in the inverter are connected to route the current flow 525 through switches S3 and S1 (but not switch S2) so that only two stator windings (e.g., C and A) are energized while the other stator winding (e.g., B) is not powered. In the fifth step switching configuration 515, the third phase voltage (e.g., Phase C) applied to the third stator winding C is a positive voltage (e.g., $U_{DC\ BUS}$) and the first phase voltage (e.g., Phase A) applied to the first stator winding A is a negative voltage (e.g., $-U_{DC\ BUS}$), while the disconnected third stator winding B may be used for voltage measurement. The fifth step switching configuration 515 corresponds to the indicated Step V in FIG. 4.

In the final depicted sixth step 516, the upper and lower power transistors in the inverter are connected to route the current flow 526 through switches S3 and S2 (but not switch S1) so that only two stator windings (e.g., C and B) are energized while the other stator winding (e.g., A) is not powered. In the sixth step switching configuration 516, the third phase voltage (e.g., Phase C) applied to the third stator winding C is a positive voltage (e.g., $U_{DC\ BUS}$) and the second phase voltage (e.g., Phase B) applied to the second stator winding B is a negative voltage (e.g., $-U_{DC\ BUS}$), while the disconnected first stator winding A may be used for voltage measurement. The sixth step switching configuration 516 corresponds to the indicated Step VI in FIG. 4.

As shown in FIG. 5, each of the six inverter switching combinations that occur during an electrical revolution are defined by a particular combination of switched power transistors (e.g., 331-336) at each step such that one top power transistor switch and one bottom power transistor switch from the connected phases are turned ON while both power transistor switches from the unconnected phase are turned OFF. For example, the switch S1 505 is shown as connecting the Phase A to the DC bus voltage ($U_{DCBUS}$) when the top power transistor switch 501 is turned ON and the bottom power transistor switch 502 is turned OFF. As will be appreciated, the switch S1 505 could be configured to connect the Phase A to the ground voltage (GND) when the top power transistor switch 501 is turned OFF and the bottom power transistor switch 502 is turned ON. As a result, each of the depicted steps 511-516 reflects an interval between two commutation events that can be measured from the unconnected phase, while also enabling creation of the motor rotating field with the two connected phases.

Figure 6:
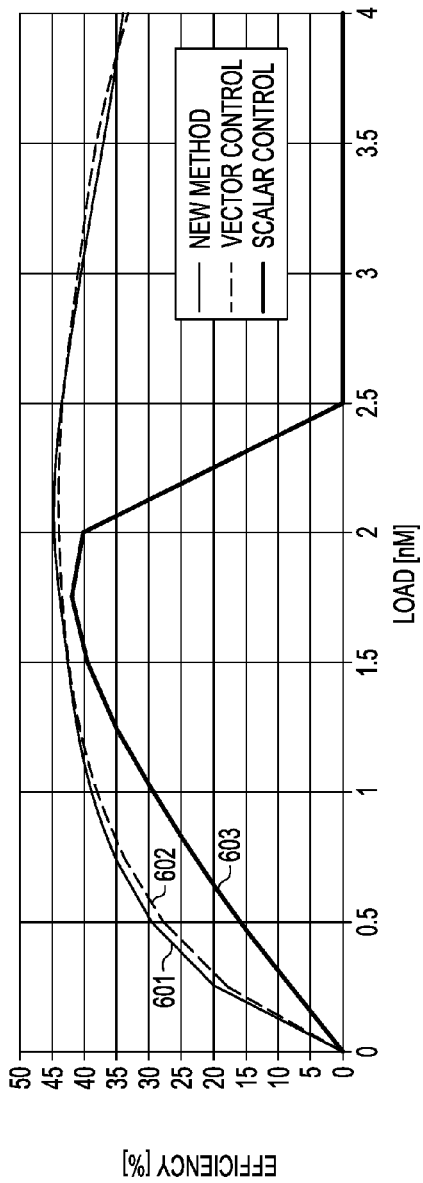
FIG. 6 is a graphical plot comparison of motor efficiency performance result measurements on an electric motor for different motor control techniques.
Figure 7:
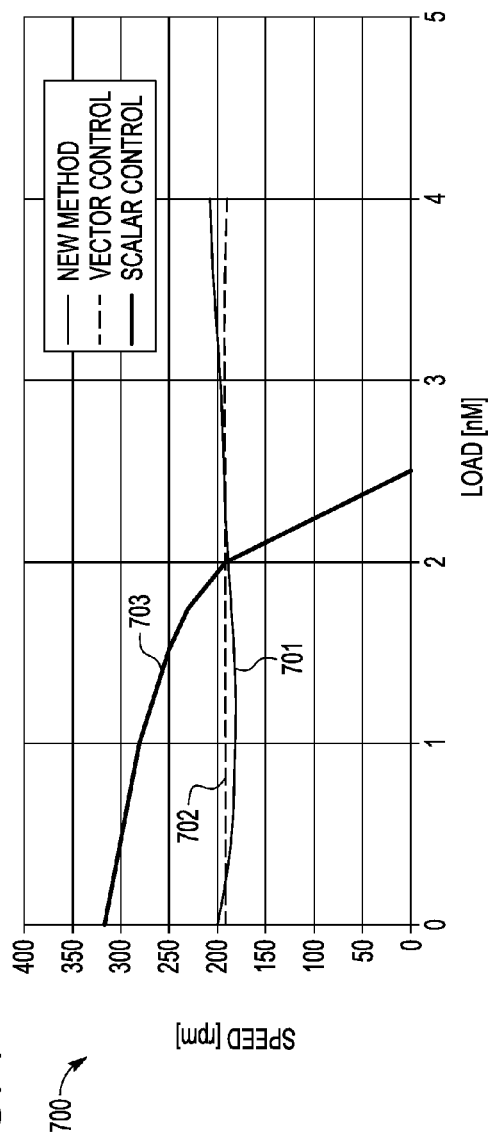
FIG. 7 is a graphical plot comparison of speed measurement precision on an electric motor for different motor control techniques.

In contrast to conventional motor control techniques, such as vector control or scalar control approaches, the sensorless ACIM control techniques disclosed herein efficiently provide comparable or improved performance with low cost and complexity and improved reliability. For example, conventional solutions, such as vector controllers, supply all three voltage phases to the stator winding and use complicated mathematical models and expensive microcontrollers to accurately measure three separate phase currents and bus voltages when computing the rotor position and speed. Other conventional solutions, such as scalar controllers, supply all three voltage phases to the stator windings and generate a constant speed of stator field, regardless of the rotor position or speed, so there is no close loop control of the rotor speed. As illustrated in FIG. 6, which shows a graphical plot comparison of motor efficiency performance result measurements (which includes both the motor and inverter efficiency), the motor efficiency performance of the sensorless ACIM control techniques for energizing only two stator coils at any given time (plot line 601) closely tracks the motor efficiency of conventional vector control techniques (plot line 602) over a wide range of motor loads, and provides a significant improvement over the motor efficiency of conventional scalar control techniques (plot line 603), especially in the higher end of motor loads. And as shown in FIG. 7, which shows a graphical plot comparison of motor speed measurement precision, the speed measurement precision for the sensorless ACIM control techniques for energizing only two stator coils at any given time (plot line 701) closely tracks the speed measurement precision of conventional vector control techniques (plot line 702) over a wide range of motor loads, and provides a significant improvement over the speed measurement precision of conventional scalar control techniques (plot line 703), especially in the higher end of motor loads.

Figure 8:
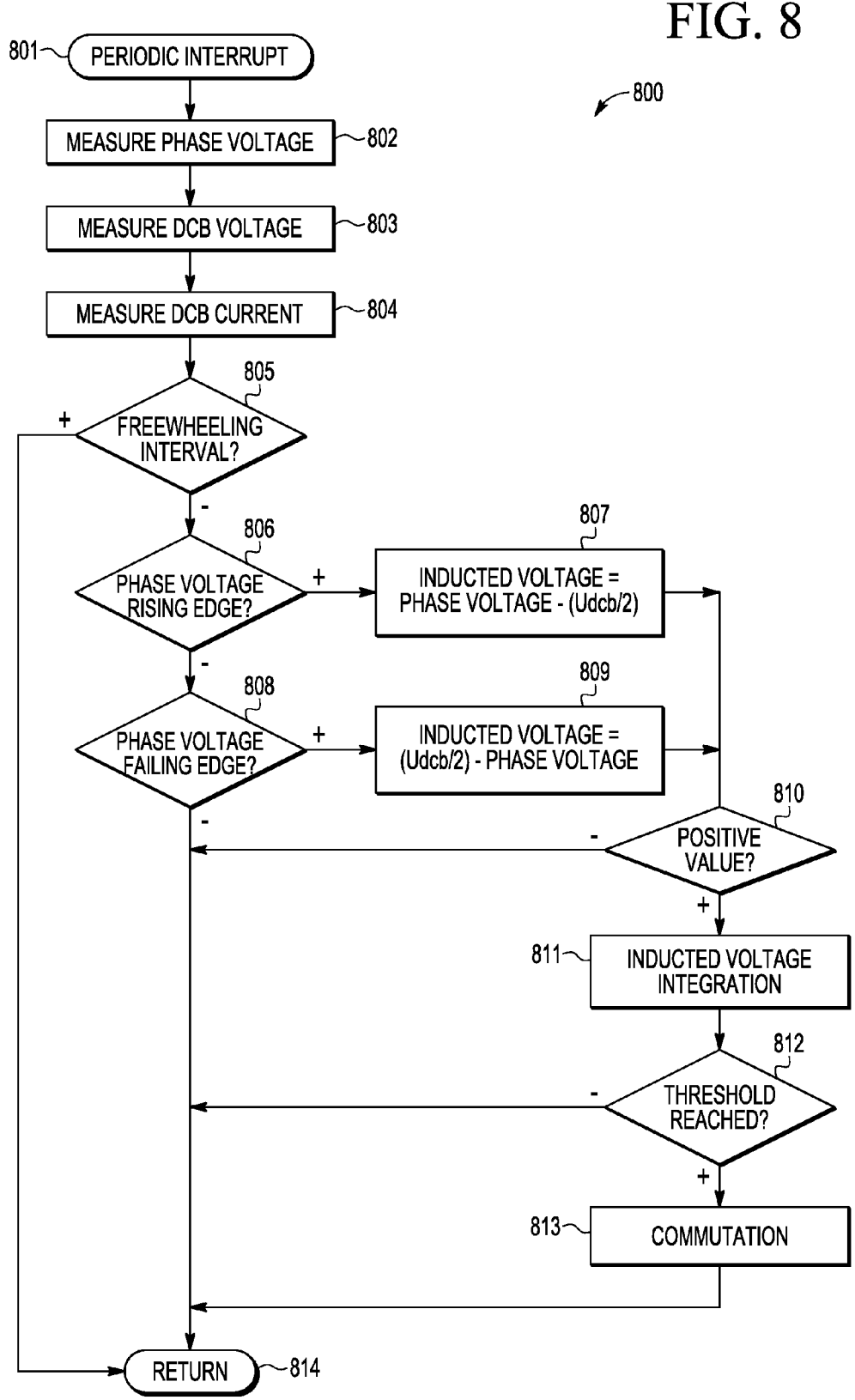
FIG. 8 illustrates a simplified flowchart of a software-based sensorless method for controlling an alternating current induction motor in accordance with selected embodiments of the present invention.

Turning now to FIG. 8, there is illustrated a simplified flow chart sequence 800 of a software-based sensorless method for controlling an alternating current induction motor in accordance with selected embodiments of the present invention. As illustrated, the flow chart sequence is run for each of the three phase voltages (Phase A, Phase B, Phase C) to track the connected and floating phase voltage status for purposes of integrating the floating phase voltage after the freewheeling interval is completed. At step 801, the method starts as part of the main control algorithm with an interrupt service routine that is invoked on a predetermined basis to periodically or otherwise control the motor by generating 3-phase PWM output signals for a three-phase according to the user interface and feedback signals. For example, the complete motor control algorithm, once initialized, may include an endless loop of speed control steps which are periodically invoked with an interrupt to monitor and control the motor speed.

At steps 802-804, the phase voltage, DC bus voltage, and DC bus current are measured or otherwise obtained. In selected embodiments, the phase voltage and DC bus current and voltage values are measured at an analog-to-digital converter (ADC) which is connected to receive the phase voltages, reference DC bus voltage and DC bus current in feedback from the inverter. By triggering the ADC with programmably delayed trigger capture signals, the measurements from steps 802-804 can effectively be ignored or disregarded during the freewheeling interval (affirmative outcome to decision step 805).

Once the freewheeling interval is complete (negative outcome to decision step 805), the measured phase voltage is processed to detect whether the phase voltage is a rising edge or falling edge transition. If a rising edge phase voltage is detected (affirmative outcome from decision step 806), then the initial inducted voltage value is set at step 807 as the difference from the measured phase voltage (from step 802) and DC bus voltage (e.g., $U_{DC\_BUS}/2$) (from step 803). On the other hand, if a falling edge phase voltage is detected (negative outcome from decision step 806 and affirmative outcome from decision step 808), then the initial inducted voltage value is set at step 809 as the difference from the measured DC bus voltage (e.g., $U_{DC\_BUS}/2$) and phase voltage.

If the initial inducted voltage is a negative value (negative outcome to decision step 810), this indicates that the phase voltage is not ready for integration, such as shown at the VI interval 403 for Phase A in FIG. 4. However, if the initial inducted voltage is a positive value (affirmative outcome to decision step 810), this indicates that the phase voltage is ready for integration, such as shown at the VI interval 406 for Phase A in FIG. 4.

At step 811, the inducted voltage is integrated, such as by using an inducted voltage sensing technique wherein only two phases of a ACIM motor are energized at a time and the third phase is a non-fed phase that can be used to sense the inducted voltage. Having excluded or disregarded the measurement results from steps 802-804 during the freewheeling interval after the commutation transient when there is a current recirculation and the fly-back diodes conduct the decaying phase current, the measured phase voltage values can be properly integrated at step 811 in a feedback loop for so long as a predetermined inducted voltage integral threshold is not reached (negative outcome to decision step 812). In this way, each new sample of the phase voltage is compared to the midpoint of the DC bus voltage (e.g., $U_{DC\_BUS}/2$) and added to integral of inducted voltage after the $U_{DC\_BUS}/2$ is subtracted. After a predetermined inducted voltage integral threshold is reached (affirmative outcome to decision step 812), a new commutation event is determined (step 813). By filtering the commutation period between commutation events to get suitable input values, such as by calculating the average commutation period from the last six commutation events, the averaged commutation period may be recalculated as the motor speed. After performing the commutation processing (step 813) or otherwise proceeding with negative outcomes from decision steps 808, 810, 812, the process returns to the main control algorithm at step 814.

Figure 9:
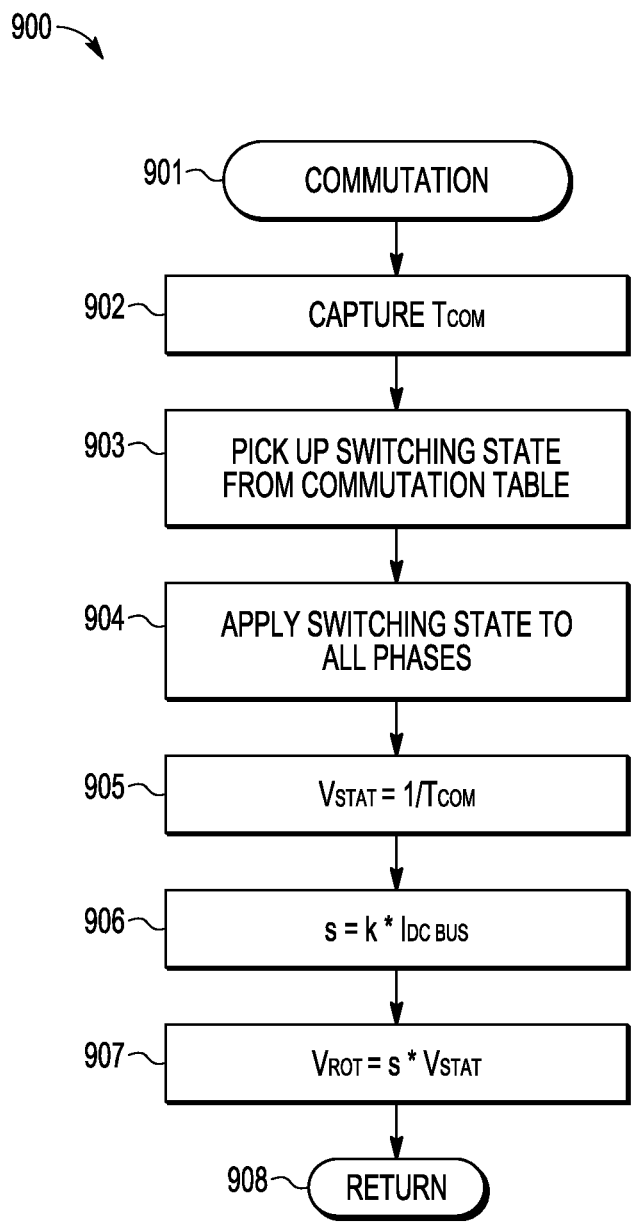
FIG. 9 illustrates a simplified flowchart of an example commutation sequence for a software-based sensorless method for controlling an alternating current induction motor in accordance with selected embodiments of the present invention.

Turning now to FIG. 9, there is illustrated a simplified flow chart sequence 900 of an example commutation sequence for a software-based sensorless method for controlling an alternating current induction motor in accordance with selected embodiments of the present invention. At step 901, the method starts, such as when the commutation process step 813 shown in FIG. 8, is performed.

At step 902, the time period between successive commutation events is calculated. In selected embodiments, the period between commutation events may be filtered to get suitable input values, such as by calculating the average commutation period from the last six commutation events.

At step 903, the switching state is picked up from the commutation table. In selected embodiments, the switching state may be retrieved from the commutation table that is derived from the inducted voltage measured on the motor for each of three phase voltages which may be connected to a positive or negative DC bus voltage or floating. In the example commutation table below, if phase C is connected to a positive DC bus voltage and phase B is connected to a negative DC bus voltage, the inducted voltage of phase A has to be evaluated for its switching state (e.g., Phase A Falling):

| Vector Number | Phase A | Phase B | Phase C | Voltage Sensing |
|---|---|---|---|---|
| 1 | DCB+ | DCB− | NC | PHASE_C_RISING |
| 5 | NC | DCB− | DCB+ | PHASE_A_FALLING |
| 4 | DCB− | NC | DCB+ | PHASE_B_RISING |
| 6 | DCB− | DCB+ | NC | PHASE_C_FALLING |
| 2 | NC | DCB+ | DCB− | PHASE_A_RISING |
| 3 | DCB+ | NC | DCB− | PHASE_B_FALLING |

At step 904, the retrieved switching state is applied to all phases. In selected embodiments, the switching state may be applied by the PWM generator.

At step 905, the stator speed or rotational velocity ($V_{STAT}$) is measured or calculated. In selected embodiments, the stator speed is calculated by first deriving the average commutation period from the last six commutation events, and the average commutation period $T_{COM}$ may be recalculated as the motor stator speed (e.g., $V_{STAT}=1/T_{COM}$).

At step 906, the estimated slip s between the stator and rotor speed for the ACIM is measured or calculated. In selected embodiments, the estimate slip s is calculated as the product of a motor construction constant k and the measured current drawn from the DC bus ($I_{DC\_BUS}$) (e.g., $s=k*I_{DC\_BUS}$).

At step 907, the estimated rotor speed or rotational velocity ($V_{ROT}$) is measured or calculated. In selected embodiments, the estimated rotor speed is calculated as the product of the estimated slip s and the stator speed or rotational velocity ($V_{STAT}$) (e.g., $V_{ROT}=s*V_{STAT}$).

At step 908, the commutation sequence returns to the sensorless method for controlling an alternating current induction motor.

By now it should be appreciated that there is provided herein a method and apparatus for controlling a sensorless alternating current induction motor (ACIM) which has a rotor and a stator with a plurality of stator windings. In the disclosed methodology and apparatus, phase shifted voltages are applied to the plurality of stator windings such that two energized stator windings are connected to first and second phase shifted voltages to cause rotation of the rotor relative to the stator while a third phase shifted voltage is not connected to a floating stator winding. To generate the plurality of phase shifted voltages, a plurality of pulse width modulated drive voltages may be selectively applied to a full bridge inverter circuit to generate the first and second phase shifted voltages to have opposite polarity and to leave the third phase shifted voltage floating. In selected embodiments, three phase shifted voltages may be applied to three stator windings, where the three phase shifted voltages are shifted from one another by 120 degrees. As the phase shifted voltages are applied, a DC bus current and an inducted voltage are measured from the ACIM while the third unconnected stator winding is floating. In selected embodiments, the DC bus current and the inducted voltage are measured by sampling the inducted voltage after expiration of a freewheeling interval in a third phase shifted voltage. Based on the DC bus current and the induced voltage, an estimated rotor speed is computed. In selected embodiments, the estimated rotor speed is computed by integrating samples of an induced voltage after expiration of the freewheeling interval until a commutation threshold is reached to determine a commutation event. In addition, a commutation period may be computed from a plurality of commutation events and an estimated stator speed may be computed from the commutation period. In addition, an estimated slip between a stator speed and rotor speed may be computed based on the measured DC bus current, and an estimated rotor speed may be computed as a product of the estimated slip and the estimated stator speed.

In another form, there is provided a sensorless alternating current induction motor (ACIM) controller an associated method of operation. In the disclosed ACIM controller and methodology, a driver power stage hardware circuit having a plurality of power transistors selectively connects first and second reference voltages to generate a plurality of phase shifted voltages under control of a plurality of PWM gate control signals, where the plurality of phase shifted voltages are connected to a corresponding plurality of stator windings in an alternating current induction motor such that a plurality of energized stator windings are energized to cause rotation of the rotor relative to the stator while at least one stator winding is disconnected and floating. In selected embodiments, the plurality of phase shifted voltages are three phase shifted voltages that are connected to three stator windings of the alternating current induction motor and that are shifted from one another by 120 degrees. In selected embodiments, the driver power stage hardware circuit is implemented as a full bridge inverter circuit which generates the plurality of phase shifted voltages such that the first and second phase shifted voltages have opposite polarity. The disclosed ACIM controller also includes a processor that is coupled to receive the plurality of phase shifted voltages and a DC bus current measurement. The processor is configured to calculate an estimated slip based on a DC bus current value measured from the DC bus current measurement. The processor is also configured to calculate a plurality of commutation events based on integration of an induced voltage from the alternating current induction motor while the at least one stator winding is disconnected and floating. To this end, the ACIM controller may include an analog-to-digital converter circuit for integrating the induced voltage by sampling the induced voltage after expiration of a freewheeling interval in a third phase shifted voltage. The processor is also configured to calculate a rotor speed based on at least the estimated slip and stator speed derived from the plurality of calculated commutation events. In selected embodiments, the processor may be configured to determine a commutation event by integrating samples of an induced voltage after expiration of the freewheeling interval until a commutation threshold is reached. In addition, the processor may be configured to calculate a commutation period from a plurality of commutation events and to compute the stator speed from the commutation period. In addition, the processor may be configured to calculate the estimated slip as a product of a motor construction constant k and the DC bus current measurement. In addition, the processor may be configured to calculate the rotor speed as a product of the estimated slip and the stator speed. The disclosed ACIM controller also includes a pulse width modulator (PWM) hardware circuit for generating the PWM gate control signals in response to the calculated rotor speed so that the driver power stage hardware circuit energizes only the plurality of energized stator windings concurrently while leaving the at least one stator winding unpowered.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a sensorless ACIM control method and apparatus without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention.

Although the described exemplary embodiments disclosed herein are directed to a method and apparatus in which the ACIM stator magnetic field is generated by energizing only two motor phases at a time and using the third, unconnected motor phase to measure the induced voltage and actual DC bus current for use in estimating the rotor speed in the context of 3-phase motor operation, the present invention is not necessarily limited to the example embodiments which illustrate inventive aspects of the present invention that are applicable to a wide variety of applications. Thus, the particular embodiments disclosed above are illustrative only and should not be taken as limitations upon the present invention, as the invention may be modified and practiced in different but equivalent manners apparent to those skilled in the art having the benefit of the teachings herein. For example, the methodology and apparatus disclosed herein may be applied to efficiently implement a sensorless motor control algorithm with low cost and complexity that is suitable for variable or constant motor load applications requiring high startup torque and reasonable efficiency for the entire load range without requiring complex sensors or precise measurements for three phase currents. While the disclosed approach may result in slightly higher torque ripple and slightly lower speed control precision than can be achieved with vector control solutions which use complicated motor models and require precise measurement of three phase currents, the advantages of the present disclosure in terms of reduced cost and complexity easily outweigh such disadvantages. In addition, the process steps may be performed in an alternative order than what is presented. Furthermore, those skilled in the art will recognize that boundaries between the functionality of the above described operations merely illustrative. The functionality of multiple operations may be combined into a single operation, or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

As disclosed herein, the sensorless ACIM control computer product, computing device, system, method, and apparatus may include or use computer program code executable on one or more central processing units or other processing devices to observe the DC bus current and phase voltage integration from the unconnected phase voltage for use in detecting commutation events and computing therefrom the stator and rotor position and speed. As such, the sensorless motor control may be implemented by way of executable program code stored within a non-transitory computer program. As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being "non-transitory" whereas a signal carrier in transit is to be considered "transitory" notwithstanding that the signal may remain in transit for a lengthy period of time.). In other embodiments, the sensorless motor control may be implemented by microcontroller, microprocessor, advanced RISC machine (ARM) processor, field-programmable gate array (FPGA) and/or ad-hoc hardware (e.g., dedicated silicon solutions) in which the sensorless motor control algorithms are advantageously embodied for more efficient processing and improved computational performance.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for controlling a sensorless alternating current induction motor (ACIM) comprising a rotor and a stator comprising a plurality of stator windings, comprising:
    applying a plurality of phase shifted voltages to the plurality of stator windings in the ACIM such that two energized stator windings are connected to first and second phase shifted voltages to cause rotation of the rotor relative to the stator while a third unconnected stator winding is floating;
    measuring a DC bus current and an inducted voltage from the ACIM while the third unconnected stator winding is floating; and
    computing an estimated rotor speed from the DC bus current and the inducted voltage, where measuring the DC bus current and the inducted voltage comprises sampling the inducted voltage after expiration of a freewheeling interval in a third phase shifted voltage.

2. The method of claim 1, where applying a plurality of phase shifted voltages comprises applying three phase shifted voltages to three stator windings, where the three phase shifted voltages are shifted from one another by 120 degrees.

3. The method of claim 1, further comprising applying a plurality of pulse width modulated drive voltages to a full bridge inverter circuit to generate the plurality of phase shifted voltages such that the first and second phase shifted voltages have opposite polarity.

4. The method of claim 1, where computing the estimated rotor speed comprises integrating samples of an inducted voltage after expiration of the freewheeling interval until a commutation threshold is reached to determine a commutation event.

5. The method of claim 4, further comprising computing a commutation period from a plurality of commutation events and the computing an estimated stator speed from the commutation period.

6. The method of claim 5, further comprising computing an estimated slip between a stator speed and rotor speed based on the measured DC bus current.

7. The method of claim 6, further comprising computing the estimated rotor speed as a product of the estimated slip and the estimated stator speed.

8. A sensorless alternating current induction motor (ACIM) controller, comprising:
    a driver power stage hardware circuit comprising a plurality of power transistors for selectively connecting first and second reference voltages to generate a plurality of phase shifted voltages under control of a plurality of PWM gate control signals, where the plurality of phase shifted voltages are connected to a corresponding plurality of stator windings in an alternating current induction motor such that a plurality of energized stator windings are energized to cause rotation of the rotor relative to the stator while at least one stator winding is disconnected and floating;
    a processor coupled to receive the plurality of phase shifted voltages and a DC bus current measurement and to calculate:
        an estimated slip based on a DC bus current value measured from the DC bus current measurement;
        a plurality of commutation events based on integration of an inducted voltage from the alternating current induction motor while the at least one stator winding is disconnected and floating; and a rotor speed based on at least the estimated slip and stator speed derived from the plurality of calculated commutation events; and a pulse width modulator (PWM) hardware circuit for generating the PWM gate control signals so that the driver power stage hardware circuit energizes only the plurality of energized stator windings concurrently while leaving the at least one stator winding unpowered.

9. The sensorless ACIM controller of claim 8, where the plurality of phase shifted voltages comprises three phase shifted voltages that are connected to three stator windings of the alternating current induction motor, where the three phase shifted voltages are shifted from one another by 120 degrees.

10. The sensorless ACIM controller of claim 8, where the driver power stage hardware circuit comprises a full bridge inverter circuit which generates the plurality of phase shifted voltages such that the first and second phase shifted voltages have opposite polarity.

11. The sensorless ACIM controller of claim 8, further comprising analog-to-digital converter circuit for integrating the inducted voltage by sampling the inducted voltage after expiration of a freewheeling interval in a third phase shifted voltage.

12. The sensorless ACIM controller of claim 11, where the processor is configured to determine a commutation event by integrating samples of an inducted voltage after expiration of the freewheeling interval until a commutation threshold is reached.

13. The sensorless ACIM controller of claim 12, where the processor is configured to calculate a commutation period from a plurality of commutation events and to compute the stator speed from the commutation period.

14. The sensorless ACIM controller of claim 13, where the processor is configured to calculate the estimated slip as a product of a motor construction constant k and the DC bus current measurement.

15. The sensorless ACIM controller of claim 14, where the processor is configured to calculate the rotor speed as a product of the estimated slip and the stator speed.

16. A system for controlling a sensorless alternating current induction motor (ACIM) comprising a rotor and a stator comprising a plurality of stator windings, comprising:

a full bridge inverter circuit for generating a plurality of phase shifted voltages under control of a plurality of PWM control signals, where the plurality of phase shifted voltages are connected to a corresponding plurality of stator windings in an alternating current induction motor such that a plurality of energized stator windings are energized in a connected phase to cause rotation of the rotor relative to the stator while at least one stator winding is floating in a disconnected phase;

a phase voltage observer coupled to receive the plurality of phase shifted voltages from the full bridge inverter circuit for generating a plurality of commutation events for each of the plurality of phase shifted voltages by integrating an inducted phase voltage during the disconnected phase and producing a stator period measure based on the plurality of commutation events;

a slip compensation block coupled to receive a DC bus current measurement value from the full bridge inverter circuit for computing an estimated slip as function of the DC bus current measurement value;

a speed measurement hardware circuit for producing an estimated rotor speed based on the estimated slip and stator period measure;

a pulse width modulator (PWM) hardware circuit for generating the PWM control signals in response to the estimated rotor speed so that the full bridge inverter circuit energizes only the plurality of energized stator windings concurrently while leaving the at least one stator winding unpowered.

17. The system of claim 16, where the phase voltage observer generates the commutation event by sampling the inducted phase voltage from the at least one stator winding after expiration of a freewheeling interval in the disconnected phase until a commutation threshold is reached.

18. The system of claim 17, where the phase voltage observer further computes stator period measure from a commutation period that is derived from the plurality of commutation events.

19. The system of claim 18, where the speed measurement hardware circuit computes the estimated rotor speed as a product of the estimated slip and stator period measure.

* * * * *